Patented June 10, 1941

2,245,491

UNITED STATES PATENT OFFICE 2,245,491

PRODUCTION OF UREA-FORMALDEHYDE RESINS

Adolf Menger, Eugen Bock, and Paul Didden, Krefeld-Uerdingen, Germany, assignors, by mesne assignments, to Plaskon Company, Incorporated, Toledo, Ohio, a corporation of Delaware No Drawing. Application September 2, 1938, Serial No. 228,180. In Germany September 25, 1937

3 Claims. (Cl. 260—29)

This invention relates to improvements in compositions of matter suitable especially as binding agents and adhesives.

It is known to employ aqueous solutions of condensation products from urea or thiourea and an aldehyde, primarily formaldehyde, as binding agents and also for adhesion of various materials and also for purposes of surface treatment. By suitable hardening agents, particularly by acid substances or substances splitting off acid, according to known processes the originally water-soluble condensation product is converted in situ into a water-insoluble form.

Attempts to carry out the condensation of the urea or urea derivative with the aldehyde from the commencement beyond the water-soluble stage, and to employ a condensation product thereby obtained, which is difficultly soluble or insoluble in water, as binding agent, are in most cases unsuccessful or such a method can only be operated in a technically inapplicable manner. Thus, for example, the jelly-like masses which can be produced on further condensation of the aqueous solution of a product from urea and formaldehyde and which contain the condensation product no longer in water-soluble form, cannot satisfactorily be introduced upon surfaces of materials to be combined or coated. Such jellies even after dilution cannot be sprayed and can be employed neither for finishing, dressing or printing purposes nor as impregnating agents.

According to the present invention compositions of matter suitable especially as binding agents of advantageous properties are obtained when condensation products from urea, thiourea or its derivatives and aldehydes, especially formaldehyde, which are condensed beyond the water-soluble condition, are very finely divided in a liquid medium, for example alcohols, such as methyl alcohol, ethyl alcohol and propyl alcohol, esters, such as ethyl acetate, propyl acetate and butyl acetate, ketones, such as acetone and advantageously in water. This can take place for example in a particularly advantageous manner if the condensation is carried out in the presence of a dispersing agent, such as protective colloids or emulsifying agents; as such may be mentioned casein, glue and other albuminoid compounds, solubilised starch, for example solubilised potato starch, cellulose derivatives, as for example ethers, such as cellulose methyl ether, cellulose esters, cellulose hydroxy ethers, such as cellulose oxyethyl ether, ether carboxylic acids of cellulose, such as the ether of cellulose and glycolic acid, vegetable mucilages, such as Irish moss, agar-agar, tragacanth, gum-arabic and especially carob bean flour, water-soluble or water-emulsifiable polyvinyl ethers, such as polyvinyl methyl ether and water-soluble mixed polymerisates of this ether with other ethers, water-soluble or water-emulsifiable derivatives of mixed polymerisates from unsaturated carboxylic acids, such as alkali salts of polymerisates of maleic acid or acrylic acid with vinyl ethers, vinyl esters, styrene and other unsaturated polymerisable compounds, reaction products of ethylene oxide on higher molecular alcohols, for example on octadecyl alcohol, on oleic alcohol, on ricinoleic acid as well as on phenols, sulphonic acids of hydrocarbons, such as alkylated naphthalenes, for example diethyl or dimethyl naphthalene, resin and wax soaps and others. Also finely divided solid substances can be employed as dispersing agents for the fine division of the condensation products, for example kieselguhr and bentonite, further by purely mechanical means, as for example by suitable stirring, kneading or emulsifying machines and the like the formation of fine dispersions can be effected. When employing instead of water an organic solvent as carrier of the dispersion, then instead of the specified water-soluble or water-emulsifiable dispersing materials such are to be employed as are soluble or emulsifiable in the organic solvent concerned.

Instead of starting from solutions of the initial condensation products, the condensation can also be carried out in the dry condition to the desired degree and by suitable means, in particular by admixture of the above specified protective colloids or emulsifiers, in this case with advantage also of a water-soluble condensation product from urea or a urea derivative and aldehyde, the result achieved that the product on incorporation with water or an inorganic liquid becomes finely divided therein. Likewise the dispersions produced in the presence of water or an organic liquid can be converted into dry form and subsequently again finely divided for the purpose of application in water or another liquid.

Such dispersions are stable without alteration for a long time if by the selection of a suitable hydrogen ion concentration in the liquid distributing medium care is taken that no further condensation takes place. In many cases it may be recommended prior to coating on the materials to be united, coated or impregnated, to effect a further condensation by means of catalysts, as for example basic or acid reacting substances.

The astonishing observation has been made that such dispersions, for example in the gluing of wood, are considerably more advantageous than the aqueous solutions of urea-aldehyde condensation products hitherto employed for this purpose. The penetration of the adhesive through thin and porous articles to be united, for example, wood veneers, can be much more completely prevented than with the application of the known solutions. Furthermore the dispersions have an excellent binding capacity for pigments, for example iron oxide red, chromium oxide green, lithopone, titanium white and ochre, furthermore for fillers, such as ferric oxide, ground slate, chalk and talcum. Finally, they are applicable as finishing and dressing agents, as thickening agents for printing purposes and so on.

The invention is illustrated by the following examples without being restricted thereto; the parts are by weight:

Example 1

7.5 parts by weight of potato starch are mixed with 92.5 parts of boiling water. The solution of potato starch obtained in this manner is mixed after cooling with 100 parts by weight of a 50% aqueous solution of a soluble condensation product obtained in known manner from urea and formaldehyde by weak alkaline condensation. This mixture is added by stirring with 3 liters n-hydrochloric acid; then stirring is continued until the mixture has become highly viscous. Finally neutralisation is performed by adding 3 liters n-sodium hydroxide solution. In this manner a dispersion is produced suitable for coating.

For the adhesion of wood for example 100 parts by weight of this dispersion are mixed with 10 parts by weight of a 10% aqueous ammonium chloride solution, both sides of a cam wood veneer are coated therewith, on both sides thereof a further cam wood veneer not coated with glue laid in such a manner that the grain is at right angles to that of the veneer coated with glue, the whole pressed for 10 minutes in a press heated to 100° C. and in this manner an excellently glued ply-wood sheet obtained.

Example 2

20 parts by weight of the 50% solution of a urea-formaldehyde condensation product set forth in Example 1 are mixed with a solution of 2 parts by weight of carob bean flour in 90 parts of water, 2.5 parts by weight of 3.6% hydrochloric acid introduced, the whole stirred for about 30 minutes until a distinct thickening is observed and then the condensation interrupted by the addition of 2.5 parts by weight of 4% caustic soda lye. The viscous dispersion thus produced is excellently suited for the adhesion of paper.

Example 3

95 parts by weight of lithopone and 5 parts by weight of chromium oxide green are stirred to a paste with 25 parts of water and then 100 parts by weight of the dispersion obtained as set forth in Example 2 admixed. This color composition is suitable for the coating of paper, pasteboard, wood and the like.

We claim:

1. A process for producing urea resin compositions suitable for use as coating, adhesive compositions and the like which consists in condensing a urea with formaldehyde in a weakly alkaline aqueous solution to produce a water-soluble condensation product, admixing with said condensation product a small amount, compared to the amount of the condensation product, of a dispersing agent, acidifying said mixture, continuing the condensation until a water-insoluble but still reactive heat- and acid-hardenable resin is obtained and interrupting the condensation by neutralization of the reaction mixture.

2. The process as defined in claim 1, wherein the ratio of condensation product to dispersing agent is from about 5 to about 7 to 1.

3. The process as defined in claim 1, wherein the dispersing agent is employed in a ratio of about 1 part to about 5 to 7 parts of the condensation product, and the mixture is acidified by means of hydrochloric acid.

ADOLF MENGER.
EUGEN BOCK.
PAUL DIDDEN.